United States Patent

Fujita et al.

[11] Patent Number: 5,945,810
[45] Date of Patent: Aug. 31, 1999

[54] BATTERY PROTECTIVE CIRCUIT

[75] Inventors: Hiroyuki Fujita; Koichi Inoue, both of Kyoto, Japan

[73] Assignee: Rohm Co., Ltd., Kyoto, Japan

[21] Appl. No.: 09/068,542

[22] PCT Filed: Sep. 22, 1997

[86] PCT No.: PCT/JP97/03375

§ 371 Date: May 13, 1998

§ 102(e) Date: May 13, 1998

[87] PCT Pub. No.: WO98/13923

PCT Pub. Date: Apr. 2, 1998

[30] Foreign Application Priority Data

Sep. 24, 1996 [JP] Japan .................................. 8-251493

[51] Int. Cl.⁶ .................................................. H01M 10/46

[52] U.S. Cl. ........................... 320/134; 320/136; 320/155

[58] Field of Search ..................................... 320/125, 128, 320/132, 134, 136, 148, 163, 166, 155, 133, DIG. 21

[56] References Cited

FOREIGN PATENT DOCUMENTS

| | | |
|---|---|---|
| 37-2267 | 2/1937 | Japan . |
| 55-2818 | 1/1980 | Japan . |
| 55-43750 | 10/1980 | Japan . |
| 4-304015 | 10/1992 | Japan . |
| 5-33645 | 4/1993 | Japan . |
| 6-303728 | 10/1994 | Japan . |

*Primary Examiner*—Edward H. Tso
*Attorney, Agent, or Firm*—Nikaido, Marmelstein, Murray & Oram LLP

[57] ABSTRACT

A battery protection circuit has an overcharge detection circuit that detects overcharge of a battery and a charge inhibition circuit that, when overcharge is detected, inhibits charging with a delay produced by a capacitance element. This charge inhibition circuit can detect a short circuit in the capacitance element that is used to produce a predetermined delay, and, when it detects a short circuit in the capacitance element, it inhibits charging without delay. Thus, since charging is inhibited even when the capacitance element is short-circuited, a power supply unit incorporating this battery protection circuit is safer to use.

6 Claims, 5 Drawing Sheets

BATTERY PROTECTIVE CIRCUIT

TECHNICAL FIELD

The present invention relates to a battery protection circuit having a function for protecting rechargeable batteries such as lithium-ion cells against overcharge.

BACKGROUND ART

A lithium-ion power supply unit that employs lithium-ion cells as a power source (such a power supply unit is also called a "lithium-ion battery pack") usually incorporates a lithium-ion cell protection circuit for protecting the lithium-ion cells from overcurrent, overdischarge, and overcharge. A conventional lithium-ion power supply unit incorporating, for example, two serially connected lithium-ion cells and a lithium-ion cell protection circuit is constituted and operates as follows.

FIG. 4 is a block diagram of a conventional lithium-ion power supply unit having two lithium-ion cells connected in series. Numerals 101 and 102 represent lithium-ion cells. Numeral 103 represents a charge control FET (an n-channel field-effect transistor) for switching the state of the power supply unit between a state in which the lithium-ion cells 101 and 102 are charged and a state in which they are not charged. Specifically, when the FET 103 is on, the lithium-ion cells 101 and 102 are charged, and, when the FET 103 is off, they are not charged. Numeral 104 represents a charge control FET control circuit for turning on and off the charge control FET 103. Numerals 105 and 106 respectively represent a positive and a negative output terminal of the power supply unit. Numerals 107 and 108 represent resistors. Numeral 109 represents a chip capacitor provided as a capacitance element. Numeral 200 represents a lithium-ion cell protection circuit for protecting each of the lithium-ion cells 101 and 102 from overcharge. T1, T2, T3, T4, and T5 represent terminals of the lithium-ion cell protection circuit 200.

The higher-potential end of the series of the two lithium-ion cells 101 and 102 is connected to the positive terminal 105, and is also connected through the resistor 107 to the terminal T1. The node A between the two lithium-ion cells 101 and 102 is connected through the resistor 108 to the terminal T2. The lower-potential end of the series of the two lithium-ion cells 101 and 102 is connected through the FET 103 to the negative terminal 106, and is also connected to the terminal T3. Note that the terminal T3 is grounded within the lithium-ion cell protection circuit 200, and therefore the voltage at the lower-potential end of the series of the two lithium-ion cells 101 and 102 equals the ground level. The charge control FET control circuit 104 has its input connected to the terminal T4, and has its output connected to the gate of the charge control FET 103. The chip capacitor 109 has its one end connected to the terminal T5, and has its other end grounded.

The lithium-ion cell protection circuit 200 consists of an overcharge detection circuit 1 and a delay setting circuit 7. The overcharge detection circuit 1 is composed of two comparators 11 and 12, two constant voltage sources 13 and 14 whose output voltages are $V_{ref1}$ and $V_{ref2}$ respectively, and an OR circuit 15. The comparator 11 has its non-inverting input terminal (+) connected to the terminal T1, and has its inverting input terminal (−) connected to the higher-potential end of the constant voltage source 13, whose lower-potential end is connected to the terminal T2. The comparator 12 has its non-inverting input terminal (+) connected to the terminal T2, and has its inverting input terminal (−) connected to the higher-potential end of the constant voltage source 14, whose lower-potential end is grounded. The OR circuit 15 receives as its inputs the outputs of the comparators 11 and 12, and the output of the OR circuit 15 is used as the output of the overcharge detection circuit 1.

As a result of the above-described interconnection, the overcharge detection circuit 1 operates as follows. When the voltage across either of the lithium-ion cells 101 and 102 exceeds a predetermined voltage (the predetermined voltage is $V_{ref1}$ for the lithium-ion cell 101 and $V_{ref2}$ for the lithium-ion cell 102), that is, when overcharge starts, the overcharge detection circuit 1 outputs a high level (this high-level output is hereafter referred to as the "overcharge detection signal").

On the other hand, the delay setting circuit 7 is composed of a comparator 71, constant current sources 72 and 76, an npn-type transistor 73, an inverter 74, and a constant voltage source 75 whose output voltage is $V_0$. The constant current source 72 is connected to the OR circuit 15, and is so configured as to be turned on when it receives the overcharge detection signal. The output of the constant current source 72 is connected to the terminal T5 and also to the collector of the transistor 73. The inverter 74 has its input connected to the output of the overcharge detection circuit 1 (i.e. the OR circuit 15), and has its output connected to the base of the transistor 73. The emitter of the transistor 73 is grounded. The comparator 71 has its non-inverting input terminal (+) connected to the node B between the constant current source 72, the terminal T5, and the collector of the transistor 73, and has its inverting input terminal (−) connected to the higher-potential end of the constant voltage source 75, whose lower-potential end is grounded. The constant current source 76 is so configured as to be turned on when it receives a high-level output from the comparator 71, and its output is connected to the terminal T4.

As a result of the above-described interconnection, the delay setting circuit 7 operates as follows. When the delay setting circuit 7 receives the overcharge detection signal from the overcharge detection circuit 1, the npn-type transistor 73 is turned off. This causes the constant current source 72 to start supplying a current to the terminal T5 and thereby start charging the chip capacitor 109. As time passes, the voltage across the chip capacitor 109 rises, and, when this voltage exceeds the voltage $V_0$, the comparator 71 outputs a high level, causing the constant current source 76 to supply a predetermined current to the terminal T4 (this predetermined current is hereafter referred to as the "charge inhibition signal"). That is, in response to the overcharge detection signal from the overcharge detection circuit 1, the delay setting circuit 7 outputs the charge inhibition signal with a predetermined delay t ($t=CV_0/I_0$) that depends on the current $I_0$ supplied from the constant current source 72, the capacitance C of the chip capacitor 109, and the output voltage $V_0$ of the constant voltage source 75.

Further, the input of the charge control FET control circuit 104 is connected to the terminal T4, so that, when the charge control FET control circuit 104 receives the charge inhibition signal from the delay setting circuit 7, it outputs a low level, and thereby causes the charge control FET 103 to be turned off. As a result, the lithium-ion cells 101 and 102 are cut off from a charging unit that is connected between the positive and negative terminals 105 and 106, and thereby the charging of the lithium-ion cells 101 and 102 is stopped. In this way, the lithium-ion cells 101 and 102 are protected against overcharge.

The purpose of securing a delay as described above between the detection of overcharge and the inhibition of the charging of the lithium-ion cells is to cancel erroneous activation of the overcharge detection circuit 1 by external noises.

As shown in FIG. 5, the above-described lithium-ion power supply unit is formed as a hybrid IC (integrated circuit) that has its constituent elements shown in FIG. 4, such as the chip capacitor 109 and the lithium-ion cell protection circuit 200, mounted on a single substrate 300. As a result, this lithium-ion power supply unit tends to suffer from a short circuit in the chip capacitor 109 that is caused by a crack in the chip capacitor 109, by a defect in the wiring pattern on the substrate 300, or for some other reason.

A disadvantage of the above-described conventional lithium-ion cell protection circuit 200 is that, when a short circuit occurs in the chip capacitor 109, the voltage of the non-inverting input terminal (+) of the comparator 71 of the delay setting circuit 7 is fixed at the ground level, and thus the comparator 71 never outputs a high level even if the overcharge detection circuit 1 outputs the overcharge detection signal. This means that the delay setting circuit 7 never outputs the charge inhibition signal, and accordingly, even in case of overcharge, the charging of the lithium-ion cells 101 and 102 is continued until they are brought into such hazardous condition that they start emitting smoke or even burning.

DISCLOSURE OF THE INVENTION

According to the present invention, a lithium-ion cell protection circuit that uses a capacitance element to produce a delay after the detection of overcharge of lithium-ion cells before the inhibition of charging is further provided with a means for detecting a short circuit in the capacitance element so that charging of the lithium-ion cells is inhibited when the capacitance element is found to be short-circuited.

BEST MODE FOR CARRYING OUT THE INVENTION

Figure 1:
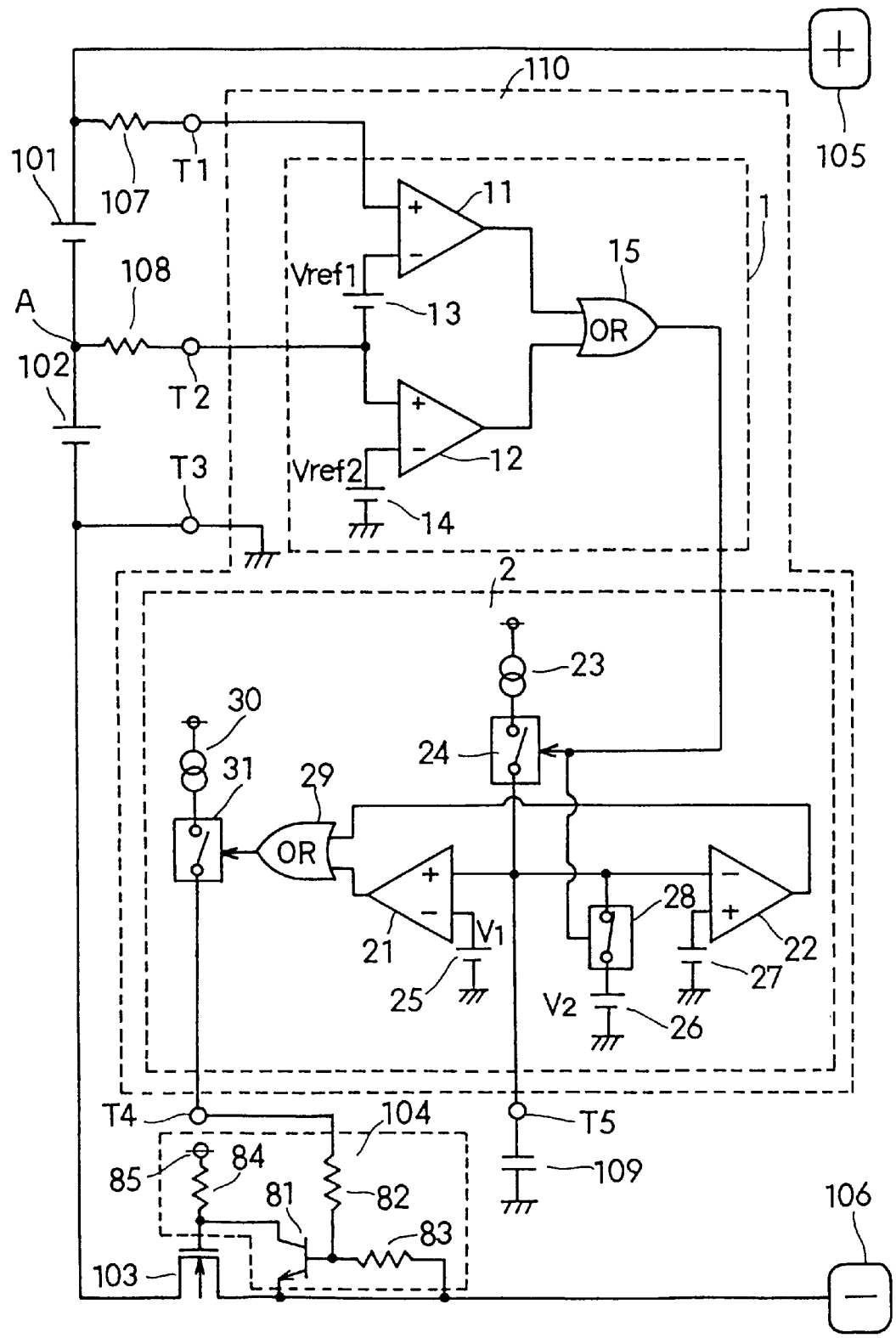
FIG. 1 is a circuit diagram of a lithium-ion power supply unit incorporating a lithium-ion cell protection circuit embodying the present invention.
Figure 4:
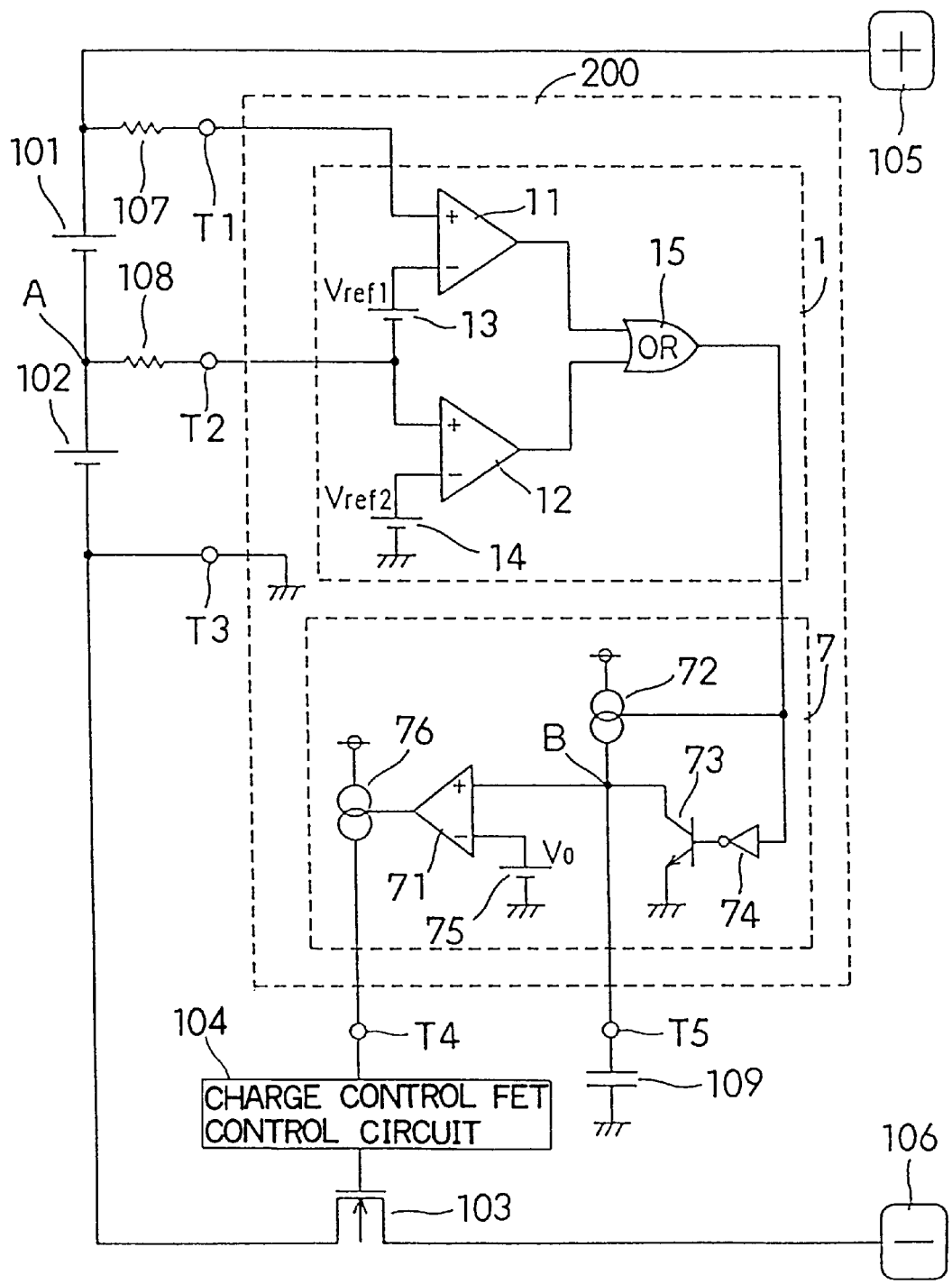
FIG. 4 is a circuit diagram of a lithium-ion power supply unit incorporating a conventional lithium-ion cell protection circuit.
Figure 5:
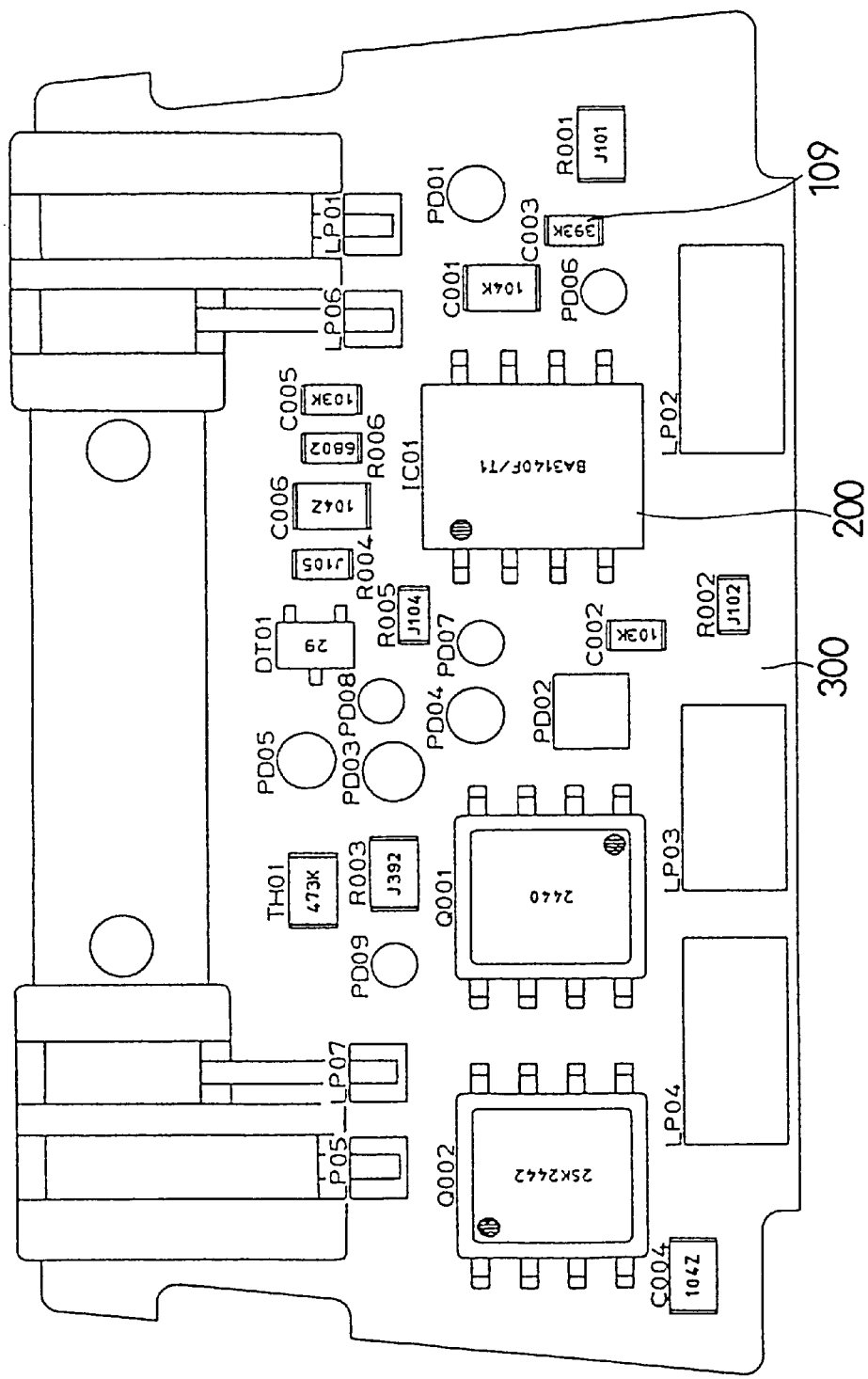
FIG. 5 is a diagram showing the structure of a lithium-ion power supply unit formed as a hybrid integrated circuit.

Hereinafter, an embodiment of the present invention will be described with reference to the drawings. FIG. 1 is a circuit diagram of a lithium-ion power supply unit incorporating two serially connected lithium-ion cells and a lithium-ion cell protection circuit 110 embodying the present invention. In FIG. 1, numeral 2 represents a delay setting circuit 2 having the function of detecting a short circuit in the capacitance element. Note that, in this figure and in the following descriptions, such elements as are found also in the conventional example shown in FIG. 4 are identified with the same designations, and overlapping explanations will not be repeated.

The delay setting circuit 2 having the function of detecting a short circuit in the capacitance element is composed of a first comparator 21, a second comparator 22, constant current sources 23 and 30, switching circuits 24, 28, and 31, constant voltage sources 25, 26, and 27 whose output voltages are respectively $V_1$, $V_2$, and $V_3$ (where $V_1 > V_2 > V_3$), and an OR circuit 29.

These components are interconnected as follows. The output of the constant current source 23 is connected through the switching circuit 24 to the terminal T5. The switching circuit 24 is so configured as to be turned on when it receives the overcharge detection signal. The terminal T5 is connected through the switching circuit 28 to the higher-potential end of the constant voltage source 26, whose lower-potential end is grounded. The switching circuit 28 is so configured as to be turned off when it receives the overcharge detection signal.

The non-inverting input terminal (+) of the first comparator 21 is connected to the terminal T5. The inverting input terminal (−) of the first comparator 21 is connected to the higher-potential end of the constant voltage source 25, whose lower-potential end is grounded. The non-inverting input terminal (+) of the second comparator 22 is connected to the higher-potential end of the constant voltage source 27, whose lower-potential end is grounded. The inverting input terminal (−) of the second comparator 22 is connected to the terminal T5.

The OR circuit 29 receives as its inputs the outputs of the first and second comparators 21 and 22, and, when the OR circuit 29 receives a high level from either of these comparators, it outputs a high level. The output of the constant current source 30 is connected through the switching circuit 31 to the terminal T4. The switching circuit 31 is so configured as to be turned on when the OR circuit 29 outputs a high level.

As a result of the above-described interconnection, the delay setting circuit 2 having the function of detecting a short circuit in the capacitance element operates as follows. While the delay setting circuit 2 does not receive the overcharge detection signal from the overcharge detection circuit 1, the switching circuit 24 remains off and the switching circuit 28 remains on. Accordingly, provided that the chip capacitor 109 is not short-circuited, the voltage at the non-inverting input terminal (+) of the first comparator 21 equals $V_2$ and the voltage at its inverting input terminal (−) equals $V_1$, whereas the voltage at the non-inverting input terminal (+) of the second comparator 22 equals $V_2$ and the voltage at its inverting input terminal (−) equals $V_3$. Here, since $V_1 > V_2 > V_3$, both of the first and second comparators 21 and 22 keep their output low, and thus the OR circuit 29 keeps its output low. Accordingly, the switching circuit 32 remains off, and therefore the constant current source 30 does not supply the predetermined current to the terminal T4. That is, while the delay setting circuit 2 does not receive the overcharge detection signal from the overcharge detection circuit 1, it never outputs the charge inhibition signal, provided that the chip capacitor 109 is not short-circuited.

When the delay setting circuit 2 receives the overcharge detection signal from the overcharge detection circuit 1, the switching circuit 24 is turned on and the switching circuit 28 is turned off. Accordingly, the voltage at the non-inverting input terminal (+) of the first comparator 21 and the voltage at the inverting input terminal (−) of the second comparator 22 both become equal to the voltage at the chip capacitor 109.

If the chip capacitor 109 is not short-circuited, that is, if it is in normal condition, the chip capacitor 109 starts being charged with the current supplied from the constant current source 23, and, as time passes, the voltage across the chip capacitor 109 rises. When this voltage exceeds the voltage $V_1$, the first comparator 21 outputs a high level, and thereby causes the OR circuit 29 to output a high level. As a result, the switching circuit 31 is turned on and outputs the charge inhibition signal. That is, provided that the chip capacitor 109 is not short-circuited, in response to the overcharge detection signal, the delay setting circuit 2 outputs the charge inhibition signal with a predetermined delay $t_1$ ($t_1 = C(V_1-V_2)/I_1$) that depends on the current $I_1$ supplied from the constant current source 23, the capacitance C of the chip capacitor 109, and the output voltages $V_1$ and $V_2$ of the constant voltage sources 25 and 26. Note that, in this case, since the voltage at the chip capacitor 109 is shifted up to $V_2$ in advance, the second comparator 22 keeps its output low throughout.

By contrast, when the chip capacitor 109 is short-circuited, the voltage at the chip capacitor 109 is fixed at the ground level, and accordingly the second comparator 22 outputs a high level. This causes the charge inhibition signal to be outputted, just as when the first comparator 21 outputs a high level. That is, when the chip capacitor 109 is short-circuited, in response to the overcharge detection signal, the delay setting circuit 2 immediately outputs the charge inhibition signal without a delay. Note that, in this case, the first comparator 21 keeps its output low throughout.

Figure 2:
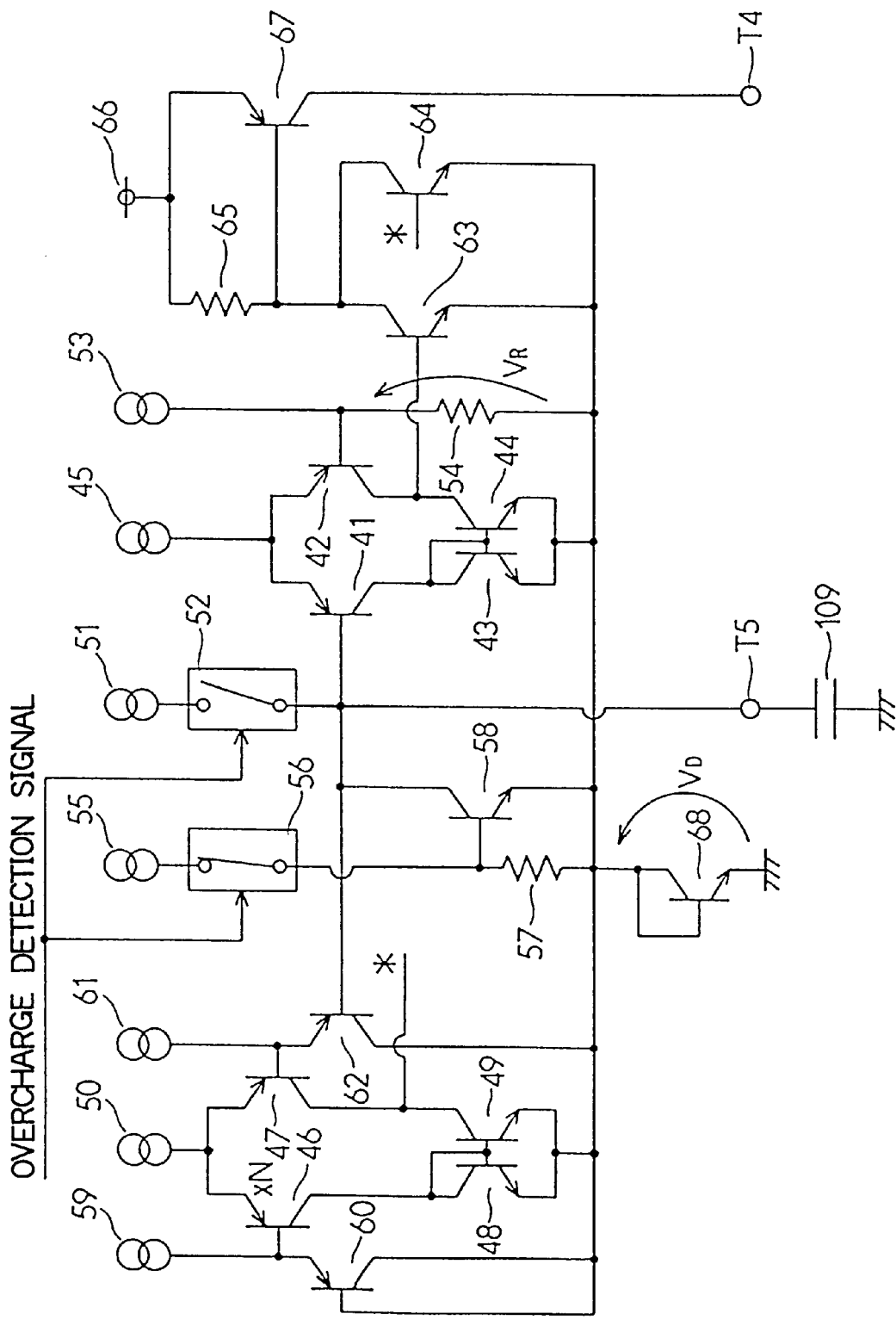
FIG. 2 is a circuit diagram of an example of the delay setting circuit having the function of detecting a short circuit in the capacitance element as used in the lithium-ion cell protection circuit shown in FIG. 1.

FIG. 2 is a more particular circuit diagram of an example of the delay setting circuit 2 having the function of detecting a short circuit in the capacitance element. In FIG. 2, numerals 41, 42, 46, 47, 60, 62, and 67 represent pnp-type transistors, numerals 43, 44, 48, 49, 58, 63, 64, and 68 represent npn-type transistors, numerals 45, 50, 51, 53, 55, 59, and 61 represent constant current sources, numerals 52 and 56 represent switching circuits, numerals 54, 57, and 65 represent resistors, and numeral 66 represents a constant voltage source.

These components are interconnected as follows. The transistors 41 and 42 form a differential pair, with their emitters connected to the constant current source 45. The collectors of the transistors 41 and 42 are connected to the input and output, respectively, of a current mirror circuit constituted by the transistors 43 and 44. The base of the transistor 41 is connected to the terminal T5, which is connected through the switching circuit 52 to the constant current source 51. The resistor 54 has its one end connected to the constant current source 53, and has its other end connected to the collector of the diode-connected and emitter-grounded transistor 68. The base of the transistor 42 is connected to that end of the resistor 54 which is connected to the constant current source 53. The current supplied from the constant current source 45 flows into the collector of the transistor 68. The switching circuit 52 is so configured as to be turned on when it receives the overcharge detection signal.

The transistors 46 and 47 form a differential pair, with their emitters connected to the constant current source 50. The collectors of the transistors 46 and 47 are connected to the input and output, respectively, of a current mirror circuit constituted by the transistors 48 and 49. The bases of the transistors 46 and 47 are connected to the emitters of the transistors 60 and 62, respectively. The current supplied from the constant current source 50 flows into the collector of the transistor 68. The transistors 46 and 47 are so configured that, when the same base voltage is applied thereto, the transistor 46 allows N times (N>1) more current to flow therethrough than the transistor 47 does.

The transistor 60 is diode-connected, and has its emitter connected to the constant current source 59 and its collector connected to the collector of the transistor 68. The transistor 62 has its emitter connected to the constant current source 61, has its collector connected to the collector of the transistor 68, and has its base connected to the terminal T5.

The resistor 57 has its one end connected through the switching circuit 56 to the constant current source 55, and has its other end connected to the collector of the transistor 68. The base of the transistor 58 is connected to that end of the resistor 57 which is connected though the switching circuit 56 to the constant current source 55. The emitter of the transistor 58 is connected to that end of the resistor 57 which is connected to the collector of the transistor 68. The collector of the transistor 58 is connected to the terminal T5. The switching circuit 56 is so configured as to be turned off when it receives the overcharge detection signal.

The base of the transistor 63 is connected to the node between the collectors of the transistors 42 and 44, and the base of the transistor 64 is connected to the node between the collectors of the transistors 47 and 49. The collectors of the transistors 63 and 64 are both connected through the resistor 65, which serves as a load common to the two transistors, to the constant voltage source 66. The emitters of the transistors 63 and 64 are connected to the collector of the transistor 68. The transistor 67 has its emitter connected to the constant voltage source 66, has its collector connected to the terminal T4, and has its base connected to the node between the resistor 65 and the collectors of the transistors 63 and 64.

As a result of the above-described interconnection, the delay setting circuit 2 having the function of detecting a short circuit in the capacitance element operates as follows. Assume that the voltage at the diode-connected transistor 68 is $V_D$ and the voltage at the resistor 54 is $V_R$. While the delay setting circuit 2 does not receive the overcharge detection signal, the switching circuit 52 remains off, and the switching circuit 56 remains on. Accordingly, provided that the chip capacitor 109 is not short-circuited, the base voltage of the transistor 41 approximately equals $V_D$, and the base voltage of the transistor 42 equals $V_R+V_D$. Thus, the transistor 63 remains off. On the other hand, the base voltages of the transistors 60 and 62 both equal $V_D$, and the base voltages of the transistors 46 and 47 are equal. However, since more current flows through the transistor 46 than through the transistor 47, the transistor 64 remains off. Thus, since both of the transistors 63 and 64 remain off, the transistor 67 remains off, and accordingly the charge inhibition signal is not outputted (i.e. no current is supplied to the terminal T4). That is, while the delay setting circuit 2 does not receive the overcharge detection signal, it never outputs the charge inhibition signal, provided that the chip capacitor 109 is not short-circuited.

When the delay setting circuit 2 receives the overcharge detection signal, the switching circuit 52 is turned on, and the switching circuit 56 is turned off. Accordingly, the transistor 58 is turned off, and thus the base voltages of the transistors 41 and 62 both become equal to the voltage at the chip capacitor 109.

If the chip capacitor 109 is not short-circuited, that is, if it is in normal condition, the chip capacitor 109 starts being charged with the current supplied from the constant current source 51, and, as time passes, the voltage across the chip capacitor 109 rises. When this voltage exceeds the voltage $V_R+V_D$ and the base voltage of the transistor 41 exceeds that of the transistor 42, the transistor 63 is turned on, and thus the transistor 67 is turned on and outputs the charge inhibition signal. That is, in response to the overcharge detection signal, the delay setting circuit 2 outputs the charge inhibition signal with a predetermined delay $t_2$ ($t_2=CVR/I_2$, where $I_2$ represents the current supplied from the constant current source 51). Note that, in this case, since the voltage at the chip capacitor 109 is shifted up to $V_D$, the transistor 64 remains off throughout.

By contrast, if the chip capacitor 109 is short-circuited, he base voltage of the transistor 60 equals $V_D$, but the base voltage of the transistor 62, that is, the voltage at the chip capacitor 109 is fixed at the ground level. Accordingly, the transistor 64 is turned on, and thus the transistor 67 is also turned on and outputs the charge inhibition signal. That is, in response to the overcharge detection signal, the delay setting circuit 2 immediately outputs the charge inhibition signal without a delay. Note that, in this case, the transistor 63 remains off throughout. Note also that this circuit is so configured that, even though more current flows through the transistor 46 than through the transistor 47, the transistor 64 is turned on when the base voltage of the transistor 60 equals $V_D$ and the base voltage of the transistor 62 is close to the ground level.

In FIG. 2, the delay setting circuit 2 having the function of detecting a short circuit in the capacitance element is illustrated as having only one diode-connected transistor 68. However, the delay setting circuit 2 may be provided with more than one diode-connected transistor, or the diode-connected transistor 68 may be replaced with a diode or a resistor. Moreover, the delay setting circuit 2 may be used in a lithium-ion cell protection circuit of the type that protects lithium-ion cells not only against overcharge but also against overcurrent and overdischarge.

The charge control FET control circuit 104 is composed of an npn-type transistor 81, resistors 82, 83, and 84, and a constant voltage source 85. These components are interconnected as follows. The transistor 81 has its base connected to the node between the serially-connected resistors 82 and 83, and has its collector connected through the resistor 84 to the constant voltage source 85. The other end of the resistor 82 is connected to the terminal T4. The other end of the resistor 83 and the emitter of the transistor 81 are connected to the node between the charge control FET 103 and the negative terminal 106. The node between the collector of the transistor 81 and the resistor 84 is connected to the gate of the charge control FET 103. The purpose of using the constant current source 30 as the output of the delay setting circuit 2 is to prevent an abnormally high current from flowing through the transistor 81 of the charge control FET control circuit 104 into the negative terminal 106 in abnormal condition. Accordingly, the charge control FET control circuit 104 can be omitted if the output of the OR circuit 29 of the delay setting circuit 2 is supplied directly, i.e. simply through an inverter or the like, to the gate of the charge control FET 103.

In the above-described embodiment, when a short circuit occurs in the chip capacitor 109, the voltage at the inverting input terminal (–) of the second comparator 22, in the case of FIG. 1, or the base voltage of the transistor 62, in the case of FIG. 2, becomes equal to the ground level. Accordingly, in such a situation, the charge inhibition signal appears unconditionally, even if the overcharge detection signal is absent. That is, once the chip capacitor 109 is short-circuited, it is no longer possible to charge the lithium-ion cells 101 and 102 even if they have not reached an overcharged state yet, nor is it possible to supply power to the load. Accordingly, such a constitution, on the one hand, helps achieve effective precaution against abnormal condition, i.e. a short circuit in the chip capacitor 109 in this case, but, on the other hand, harms the operability of the power supply unit as a whole. This inconvenience, however, can be relieved by constituting the lithium-ion cell protection circuit 110 as follows.

Figure 3:
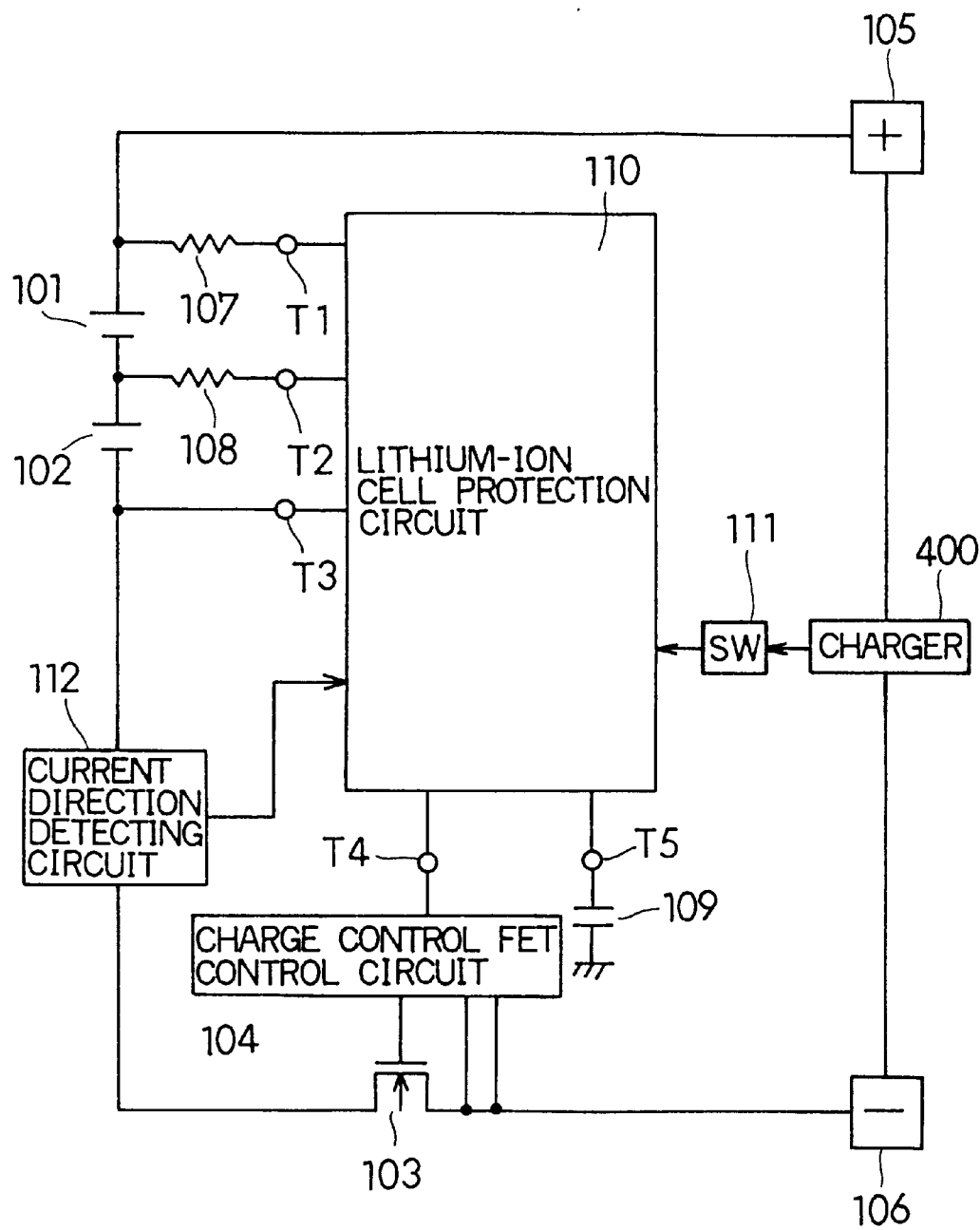
FIG. 3 is a block diagram of a lithium-ion power supply unit provided with a mechanical switch or a current direction detecting circuit for controlling the operation of the lithium-ion cell protection circuit embodying the present invention.

For example, as shown in FIG. 3, it is possible to additionally provide the lithium-ion cell protection circuit 110 with a mechanical switch 111 for detecting whether a charger 400 is connected between the positive and negative terminals 105 and 106, or a current direction detecting circuit 112 for detecting the direction of the current flowing between the positive and negative terminals 105 and 106. This enables the lithium-ion cell protection circuit 110 to recognize whether the lithium-ion cells 101 and 102 are in the process of being charged or of discharging, and thus makes it possible to activate the over-charge detection circuit 1 and the delay setting circuit 2 of the lithium-ion cell protection circuit 110 only when the lithium-ion cells 101 and 102 are in the process of being charged. As a result, as long as the lithium-ion cells 101 and 102 are in the process of discharging, even if the chip capacitor 109 is short-circuited, the charge inhibition signal never appears, and thus it is possible to supply power to the load.

Alternatively, the lithium-ion cell protection circuit 110 may be so configured that, in the case of FIG. 1, the second comparator 22 is driven by a voltage derived from the output of the OR circuit 15 of the overcharge detection circuit 1, or, in the case of FIG. 2, the constant current source 50 is turned on by the overcharge detection signal (i.e. the high level output of the OR circuit 15). This makes it possible to keep the second comparator 22 deactivated as long as the OR circuit 15 does not output a high level. That is, as long as the overcharge detection signal is absent, the second comparator 22 never outputs a high level, and the transistor 64 is never turned on. As a result, even if the chip capacitor is short-circuited, it is possible to charge the lithium-ion cells 101 and 102 or let them discharge, unless the lithium-ion cells 101 and 102 are in a state of overcharge.

As described above, the lithium-ion cell protection circuit of the embodiment can, on detecting overcharge, stop the charging of the lithium-ion cells and thus protect them from overcharge, not only when the chip capacitor 109, which serves as a capacitance element for securing a delay before the generation of the overcharge detection signal, is not short-circuited, that is, when it is in normal condition, but also when the chip capacitor 109 is short-circuited for some reason. Accordingly, the lithium-ion cell protection circuit of the embodiment helps make the power supply unit safer to use.

INDUSTRIAL APPLICABILITY

As described heretofore, according to the present invention, a battery protection circuit, despite using a capacitance element to produce a delay after the detection of overcharge of batteries before the inhibition of charging, can, on detecting overcharge, inhibit charging even if the capacitance element is short-circuited. Accordingly, the battery protection circuit is useful as a battery protection circuit for protecting batteries from overcharge; in particular, it is suitable as a battery protection circuit in which erroneous detection of overcharge due to external noises needs to be canceled.

We claim:

1. A battery protection circuit that, on detecting overcharge of a battery, secures a delay by use of a capacitance element before inhibiting charging of the battery, comprising:

means for detecting a short circuit in the capacitance element, wherein charging of the battery is inhibited when a short circuit is detected in the capacitance element.

2. A battery protection circuit as claimed in claim 1, further comprising:

means for applying a predetermined voltage to the capacitance element;

means for detecting a voltage at the capacitance element; and means for inhibiting charging of the battery when the voltage at the capacitance element drops below the predetermined voltage.

3. A battery protection circuit as claimed in claim 1, further comprising:

an offset setting circuit for applying a predetermined voltage $V_2$ to the capacitance element when overcharge is not detected;

a capacitance element charging circuit for supplying the capacitance element with a predetermined current when overcharge is detected;

first and second comparators that output a high level when a voltage at their first input terminal exceeds a voltage at their second input terminal; and an OR circuit that outputs a high level when either of the first and second comparators outputs a high level, wherein the first comparator receives, at its first input terminal, the voltage at the capacitance element and, at its second input terminal, a predetermined voltage $V_1$, and the second comparator receives, at its first input terminal, a predetermined voltage $V_3$ and, at its second input terminal, the voltage at the capacitance element, the predetermined voltages having a relation $V_1 > V_2 > V_3$, and wherein charging of the battery is inhibited by a high level output from the OR circuit.

4. A battery protection circuit as claimed in claim 3, wherein the offset setting circuit is realized by connecting the capacitance element to a node between a constant current source and a diode.

5. A battery protection circuit as claimed in claim 3, wherein the offset setting circuit is realized by connecting the capacitance element to a node between a constant current source and a diode.

6. A battery protection circuit for protecting a rechargeable battery from overcharge, comprising:

first and second terminals to which a charger is connected;

switching means whose one end is connected to one end of the battery and whose other end is connected to the second terminal, the other end of the battery being connected to the first terminal;

a detection circuit that monitors a voltage across the battery to output an overcharge detection signal when overcharge is detected;

a delay circuit having a capacitance element for delaying output of the overcharge detection signal;

voltage applying means for applying a first predetermined voltage to the capacitance element when the overcharge detection signal is absent;

current supplying means for supplying a predetermined current to the capacitance element when the overcharge detection signal is present;

first means for turning off the switching means when a voltage at the capacitance element is higher than a second predetermined voltage that is higher than the first predetermined voltage; and second means for turning off the switching means when the overcharge detection signal is present and in addition the voltage at the capacitance element is lower than a third predetermined voltage that is lower than the first predetermined voltage.

* * * * *

UNITED STATES PATENT AND TRADEMARK OFFICE
CERTIFICATE OF CORRECTION

PATENT NO. : 5,945,810
DATED : August 31, 1999
INVENTOR(S) : Fujita, et al

It is certified that error appears in the above-identified patent and that said Letters Patent is hereby corrected as shown below:

On the title page, item [54] and Column 1, delete

"BATTERY PROTECTIVE CIRCUIT", and insert -- BATTERY PROTECTION CIRCUIT --

Signed and Sealed this

First Day of February, 2000

Attest:

Q. TODD DICKINSON

Attesting Officer     Acting Commissioner of Patents and Trademarks